US006445560B1

(12) United States Patent
Bobert et al.

(10) Patent No.: US 6,445,560 B1
(45) Date of Patent: Sep. 3, 2002

(54) GAS-FILLED SURGE PROTECTOR WITH EXTERNAL SHORT-CIRCUITING DEVICE

(75) Inventors: Peter Bobert, Falkensee; Jürgen Boy, Berlin, both of (DE)

(73) Assignee: Epcos AG, Munich (DE)

( * ) Notice: Subject to any disclaimer, the term of this patent is extended or adjusted under 35 U.S.C. 154(b) by 0 days.

(21) Appl. No.: 09/367,948

(22) PCT Filed: Feb. 20, 1998

(86) PCT No.: PCT/DE98/00565

§ 371 (c)(1),
(2), (4) Date: Jan. 12, 2000

(87) PCT Pub. No.: WO98/37605

PCT Pub. Date: Aug. 27, 1998

(30) Foreign Application Priority Data

Feb. 21, 1997 (DE) ........................................ 197 08 651

(51) Int. Cl.[7] .................................................. H02H 1/00
(52) U.S. Cl. ...................................................... 361/120
(58) Field of Search ................................ 361/120, 124, 361/119, 117, 118, 129, 130; 337/32; 313/231.11, 325

(56) References Cited

U.S. PATENT DOCUMENTS 4,062,054 A * 12/1977 Simokat ..................... 361/119
4,150,414 A * 4/1979 Pagliuca ..................... 361/124
4,303,959 A * 12/1981 Roberts et al. ............. 361/124
4,320,435 A * 3/1982 Jones ......................... 361/119
4,910,489 A * 3/1990 Neuwirth et al. ............. 337/32
4,912,592 A * 3/1990 Flindall et al. ............. 361/120
4,984,125 A * 1/1991 Uwano ....................... 361/124
5,029,302 A * 7/1991 Masghati et al. ............. 337/32
5,248,953 A * 9/1993 Honl ........................... 337/32
5,475,356 A * 12/1995 Kasahara .................... 361/124
5,633,777 A * 5/1997 Boy et al. ................... 361/120
5,644,465 A * 7/1997 Lange et al. ................ 361/120

FOREIGN PATENT DOCUMENTS

| | | |
|---|---|---|
| EP | 0 312 729 | 4/1989 |
| EP | 0 516 922 | 12/1992 |
| EP | 0 548 587 | 6/1993 |
| FR | 2 670 624 | 6/1992 |
| WO | WO 87/06399 | 10/1987 |

* cited by examiner

*Primary Examiner*—Ronald W. Leja
(74) *Attorney, Agent, or Firm*—Kenyon & Kenyon

(57) ABSTRACT

A resilient bracket, in the form of an open ring that is placed on the insulator between the two electrodes and whose one end, having two side bars shaped at the sides, forms the short-circuiting link, serves as a device for the external short-circuiting of two electrodes of a gas-filled surge arrester. A spacer, which is made of a material that can be melted and which is inserted between the short-circuiting link and the insulator, holds the side bars at a radial distance from the electrodes. A surge arrester of this sort is suited in particular for arrangement in cartridges for the acceptance of a multiplicity of arresters.

4 Claims, 1 Drawing Sheet

GAS-FILLED SURGE PROTECTOR WITH EXTERNAL SHORT-CIRCUITING DEVICE

FIELD OF THE INVENTION

The present invention relates to electrical components, and is to be applied in the structural design of a gas-filled surge arrester that is provided with an external short-circuit device.

BACKGROUND INFORMATION

Short-circuit device provided with external short-circuit devices are common both in two-electrode and in three-electrode surge arresters. They function to protect the surge arrester in long-term load situations. Generally, such a short-circuit device contains a structural element that can melt at higher temperatures, with the aid of which the two electrodes, or the center electrode and one or both end electrodes, are short-circuited.

In a conventional two-electrode arrester of this type, a spring contact and an arrester contact are arranged electrically parallel to the two electrodes, the spring contact being held at a distance from the arrester contact by a spacer that is adjacent to the insulator of the arrester and that softens at increased temperatures. This spacer is made of a glass-fiber-reinforced plastic that is dimensionally stable at normal operating temperature and that softens at increased temperatures, e.g. polycarbonate. Such a two-electrode arrester is described in European Patent 0 548 587.

In addition, a conventional external short-circuit device for two- and three-electrode surge arresters is described in WO 87/06399. This short-circuit device is composed of a two-layer clamp made of a thermostatic bimetal, the two layers of the clamp passing, over at their free ends, into a monostable snap element. In the event of an overload, one part of the snap element functions to bridge the two external electrodes of the arrester. In two-electrode arresters, the bimetal clamp sits on the insulator of the arrester.

In U.S. Pat. No. 4,984,125, a conventional three-electrode arrester, an external short-circuit device is described that is composed of a bracket, made of an open ring, that is placed on the center electrode, the one end of the ring forming, together with arms shaped at the sides, a short-circuiting link. The free ends of the two arms are held at a radial distance from the end electrodes of the arrester by means of a spacer that is made of a meltable insulating material and that is arranged between the center electrode and the short-circuiting link. The free ends of the two arms can thereby be provided with special contacts. Instead of using a spacer between the center electrode and the short-circuiting link, the mentioned contacts can also be coated with an insulating coating. French Patent No. 2 670 624 describes a similarly configured external short-circuit device that can be used both for three-electrode and for two-electrode arresters. In this device, the free ends of the two arms of the short-circuiting link are bent in such a way that they abut the circumferential edge of the respective electrode, the free ends having in the area of the point of contact an insulating coating that can melt when heat is applied.

SUMMARY

The object of the present invention is to configure the short-circuit device in such a way that it extends radially past the surge arrester as little as possible, ensures a safe contacting, and is easy to install.

In order to achieve this object, it is provided according to the present invention that the spacer is arranged between the center part of the short-circuiting link and the insulator.

Such a configuration of the short-circuit device makes use of the conventional design of a short-circuit device such as that described in U.S. Pat. No. 4,984,125, but the bracket, in this context, is placed not on an electrode, but rather—in a manner such as described in French Patent No. 2 670 624)—on the insulator located between two electrodes. In this way, the short-circuiting link is arranged without potential. Given cramped installation conditions (magazine or cartridge), this can prove to be advantageous insofar as no disturbing short circuit can occur in case of contact of one side of the short-circuiting link with a contact terminal that conducts potential. Since the spacer is arranged between the short-circuiting link and the insulator, the spacer can be of relatively thin construction; in addition, a relatively inexpensive thermoplastic plastic material can be used for the spacer, since the insulator heats up with a delay relative to the electrodes that are to be short-circuited.

A surge arrester having short-circuit device configured according to the present invention is thus distinguished by a design that is very compact and that saves a great deal of space with regard to the insertion of a larger number of such arresters into cartridges, the short-circuit device being able to be made of one or two parts and to be easily adapted to various arrester geometries due to its simple configuration. The short-circuit device can also be retrofitted; it can also be exchanged after being blown, as long as the actual arrester is still intact.

The short-circuit device configured according to the present invention can be used both for two-electrode and for three-electrode arresters. In three-electrode arresters, each of the two insulators present in such arresters is to be equipped with a short-circuit device of the present configuration.

The open snap-on ring of the new short-circuit device can be made of a heat-resistant plastic or of a resilient (spring-like) metal that conducts less well electrically (e.g. spring steel or a copper alloy), a metallic short-circuiting link that conducts very well electrically (e.g. made of copper) being placed onto the one end of the open ring or being fastened there in some other way. Preferably, however, the open ring is made of the same material as the actual short-circuiting link, and is configured in one piece with the latter, the open ring being provided at the one end with two side bars, shaped at the sides, for the formation of the short-circuiting link. In order to improve the contacting, these side bars can be bent slightly at their free ends.

A plastic part that can be melted may be used as a spacer for the short-circuit device. In the same way, a spacer made of a soldering material can also be used. These spacers can, for example, have the form of a rivet fastened to the center part of the link. Alternatively, a plastic clip placed on the center part of the link can also be used.

DETAILED DESCRIPTION

Figure 1:
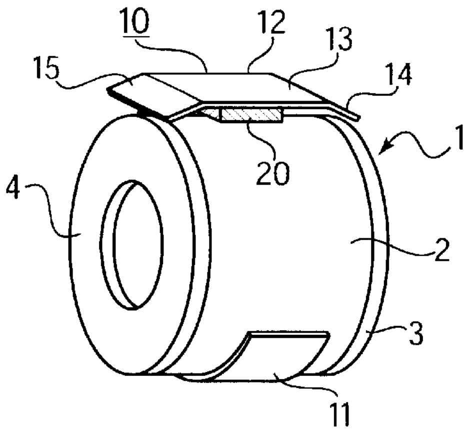
FIG. 1 shows a gas-filled surge arrester having two electrodes, equipped with a short-circuit device according to the present invention.
Figure 2:
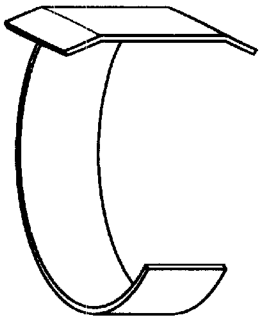
FIG. 2 shows the short-circuit device without arrester.

FIG. 1 shows a surge arrester 1 including an insulator 2 and two end electrodes 3 and 4. A short-circuit device 10 is placed on insulator 2, the device including an open ring 11 (shown separately in FIG. 2) made of cold-hammered metal and an insulating spacer 20. Open ring 11 is fashioned, in this context, as a short-circuiting link 12 at its one end, and has a center part that runs in planar fashion and two side bars 14 and 15 that are shaped at the sides and that are bent slightly at the ends. The axial length of short-circuiting link 12 is thus chosen such that the short-circuiting link does not extend past the surge arrester axially (see also FIG. 5). Spacer 20 can also be made of a soldering material.

Figure 3:
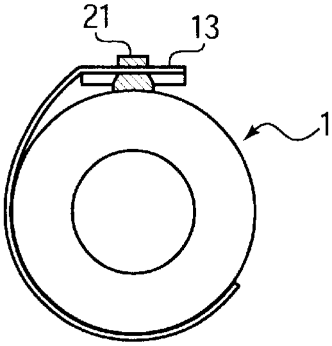
FIG. 3 shows a surge arrester in which the spacer of the short-circuit device is a rivet.
Figure 4:
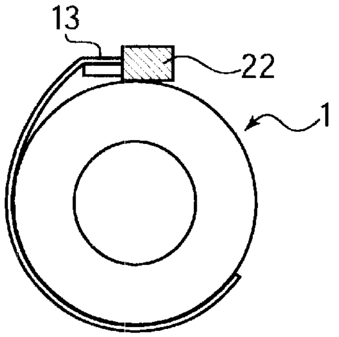
FIG. 4 shows a surge arrester having a short-circuit device in which the spacer is a plastic clip.

According to FIG. 3, the short-circuit device for arrester 1 is likewise composed of an open ring that can be snapped onto the insulator of the arrester, a plastic rivet 21 being provided as a spacer for actual short-circuiting link 13, the rivet being fixed in a bored hole of center part 13 of the short-circuiting link. According to FIG. 4, a plastic clip 22 that is pushed onto center part 13 of the short-circuiting link can be used as a spacer.

Figure 5:
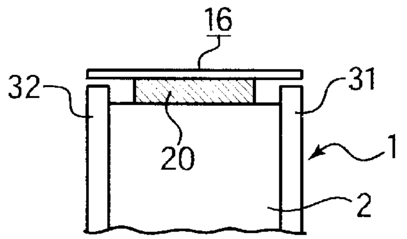
FIG. 5 shows a short-circuit device having a special configuration of the electrodes of the arrester.

According to FIG. 5, electrodes 31 and 32 of the surge arrester are provided with a larger outer diameter than insulator 2. The bending of the ends of actual short-circuit device 16 at the ends thus becomes unnecessary.

Figure 6:
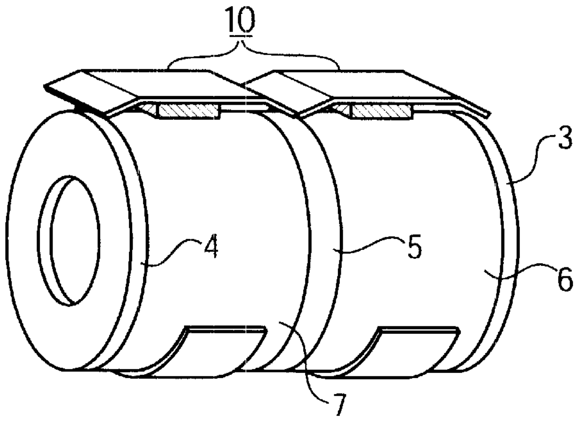
FIG. 6 shows a three-electrode arrester having two short-circuit devices placed on the two insulators.

FIG. 6 shows an arrester in which another center electrode 5 is arranged between end electrodes 3 and 4, the arrester being composed of two insulators 6 and 7. A short-circuit device 10, as is also used for the arrester according to FIG. 1, is placed onto each insulator.

What is claimed is:

1. A gas-filled surge arrester, comprising:

at least two electrodes;

an insulator arranged between the electrodes; and an overload fuse, the overload fuse including an external short-circuit device, the short-circuit device including a first short-circuiting link, a holding device and a spacer, the first short-circuiting link being electrically conductive and extending in an axial direction of the surge arrester, ends of the short-circuiting link being held at a radial distance from the electrodes by the holding device, the holding device exerting a spring force via the spacer, the spacer melting when heat is applied, the holding device including an open ring that can be snapped onto the insulator and being made of a strip-shaped resilient material, the first short-circuiting link being arranged on one end of the holding device, the spacer being arranged between a center portion of the first short-circuiting link and the insulator and being out of contact with all electrodes.

2. A gas-filled surge arrester, comprising:

at least two electrodes;

an insulator arranged between the electrodes; and an overload fuse, the overload fuse including an external short-circuit device, the short-circuit device including a first short-circuiting link, a holding device and a spacer, the first short-circuiting link being electrically conductive and extending in an axial direction of the surge arrester, ends of the short-circuiting link being held at a radial distance from the electrodes by the holding device, the holding device exerting a spring force via the spacer, the spacer melting when heat is applied, the holding device including an open ring that can be snapped onto the insulator and being made of a strip-shaped resilient material, the first short-circuiting link being arranged on one end of the holding device, the spacer being arranged between a center portion of the first short-circuiting link and the insulator;

wherein the at least two electrodes includes three electrodes, and further comprising:

a second insulator; and a second external short-circuit device including a second short-circuiting link placed on the second insulator.

3. The surge-arrestor according to claim 2, further comprising a second spacer arranged between the second short-circuiting link and the second insulator, the second spacer melting when heat is applied.

4. A gas-filled surge arrester, comprising:

at least two electrodes;

an insulator arranged between the electrodes; and an overload fuse, the overload fuse including an external short-circuit device, the short-circuit device including a first short-circuiting link, a holding device and a spacer, the first short-circuiting link being electrically conductive and extending in an axial direction of the surge arrester, ends of the short-circuiting link being held at a radial distance from the electrodes by the holding device, the holding device exerting a spring force via the spacer, the spacer melting when heat is applied, the holding device including an open ring that can be snapped onto the insulator and being made of a strip-shaped resilient material, the first short-circuiting link being arranged on one end of the holding device, the spacer being arranged between a center portion of the first short-circuiting link and the insulator;

wherein the spacer is made of a rivet that is fastened to the center portion of the first short-circuiting link, the rivet being formed of one of a plastic material and a soldering material.

* * * * *